United States Patent
Peng

(10) Patent No.: US 10,469,152 B2
(45) Date of Patent: Nov. 5, 2019

(54) INFORMATION PROCESSING APPARATUS, INFORMATION PROCESSING METHOD AND A COMPUTER PROGRAM

(71) Applicant: NEC CORPORATION, Tokyo (JP)

(72) Inventor: Xiao Peng, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/072,413

(22) PCT Filed: Jan. 29, 2016

(86) PCT No.: PCT/JP2016/000465
§ 371 (c)(1),
(2) Date: Jul. 24, 2018

(87) PCT Pub. No.: WO2017/130237
PCT Pub. Date: Aug. 3, 2017

(65) Prior Publication Data
US 2018/0367208 A1    Dec. 20, 2018

(51) Int. Cl.
| | |
|---|---|
| H04B 7/08 | (2006.01) |
| H04B 7/0456 | (2017.01) |
| G06F 17/16 | (2006.01) |
| H04B 7/0452 | (2017.01) |

(52) U.S. Cl.
CPC ......... *H04B 7/0854* (2013.01); *G06F 17/16* (2013.01); *H04B 7/0456* (2013.01); *H04B 7/0452* (2013.01)

(58) Field of Classification Search
CPC .......... H04B 1/71052; H04B 7/0854; H04B 7/0456; H04B 7/0452; H06F 17/16
See application file for complete search history.

(56) References Cited

U.S. PATENT DOCUMENTS

| | | | |
|---|---|---|---|
| 7,813,421 | B2 | 10/2010 | Sarrigeorgidis |
| 8,340,169 | B1 | 12/2012 | Sarrigeorgidis |
| 8,699,556 | B1 | 4/2014 | Sarrigeorgidis |
| 9,001,873 | B2 | 4/2015 | Sarrigeorgidis |
| 10,142,403 | B1 * | 11/2018 | Prieditis ................ H04L 67/10 |
| 2007/0165737 | A1 | 7/2007 | Sarrigeorgidis |

(Continued)

FOREIGN PATENT DOCUMENTS

| | | |
|---|---|---|
| JP | 2006-229436 A | 8/2006 |
| JP | 2007-013455 A | 1/2007 |

(Continued)

OTHER PUBLICATIONS

Herman J. Bierens, "The Inverse of a Partitioned Matrix", URLrhttp://www.math.chalmers.se/"rootzen/highdimensional/blockmatrixinverse.pdf, Jul. 21, 2013, p. 1-2.

(Continued)

*Primary Examiner* — Sung S Ahn
(74) *Attorney, Agent, or Firm* — Sughrue Mion, PLLC

(57) ABSTRACT

An information processing apparatus, comprising: a matrix inversion calculating unit that includes a higher level matrix inversion processing block containing at least four lower level matrix inversion processing blocks and two assistant processing blocks and; a control unit that reconfigures an internal structure of the matrix inversion calculating unit depending on the input matrix size.

20 Claims, 20 Drawing Sheets

(56) References Cited

U.S. PATENT DOCUMENTS

| | | | |
|---|---|---|---|
| 2007/0283221 A1* | 12/2007 | Kyung | H03M 13/1162 714/758 |
| 2012/0290867 A1 | 11/2012 | Zhang et al. | |
| 2014/0226703 A1 | 8/2014 | Sarrigeorgidis | |
| 2015/0188578 A1* | 7/2015 | Sugihara | H03M 13/116 714/752 |

FOREIGN PATENT DOCUMENTS

| | | |
|---|---|---|
| JP | 2009-524291 A | 6/2009 |
| JP | 2012-123652 A | 6/2012 |
| JP | 2013-205973 A | 10/2013 |

OTHER PUBLICATIONS

Stefan Eberli, et al., "Divide-and-Conquer Matrix Inversion for Linear MMSE Detection in SDR MIMO Receivers", NORCHIP, Nov. 16, 2008, pp. 162-167.

Shingo Yoshizawa, et al., "VLSI Implementation of a Complete Pipeline MMSE Detector for a 4×4 MIMO-OFDM Receiver", IEICE Transactions on Fundamentals of Electronics, Communications and Computer Sciences, Engineering Sciences Society, Tokyo, JP, Jul. 1, 2008, pp. 1757-1762, vol. E91A, No. 7.

Johan Eilert, et al., "Efficient Complex Matrix Inversion for MIMO Software Defined Radio", Circuits and Systems, May 1, 2007, pp. 2610-2613.

International Search Report for PCT/JP2016/000465 dated Sep. 30, 2016 [PCT/ISA/210].

Communication dated Aug. 20, 2019, from the Japanese Patent Office in counterpart application No. 2018-539444.

Hirokazu Ikeuchi, et al., "VLSI Design of a Dynamic Reconfigurable MMSE Detector for 4×4 MIMO-OFDM Receiver", IEICE Technical Report, Institute of Electronics, Information and Communication Engineers, Jun. 4, 2009, vol. 109, No. 78, pp. 79-84 (8 pages total).

* cited by examiner

Fig. 8

| 1  | 2  | 5  | 6  | 17 | 18 | 21 | 22 |
|----|----|----|----|----|----|----|----|
| 3  | 4  | 7  | 8  | 19 | 20 | 23 | 24 |
| 9  | 10 | 13 | 14 | 25 | 26 | 29 | 30 |
| 11 | 12 | 15 | 16 | 27 | 28 | 31 | 32 |
| 33 | 34 | 37 | 38 | 49 | 50 | 53 | 54 |
| 35 | 36 | 39 | 40 | 51 | 52 | 55 | 56 |
| 41 | 42 | 45 | 46 | 57 | 58 | 61 | 62 |
| 43 | 44 | 47 | 48 | 59 | 60 | 63 | 64 |

MEM(8) for power saving mode

Fig. 13

| 1 | 2 | 13 | 14 |
|---|---|----|----|
| 3 | 4 | 15 | 16 |
| 9 | 10 | 5 | 6 |
| 11 | 12 | 7 | 8 |

MEM(4) for parallel
processing mode

Fig. 14

| 1  | 2  | 13 | 14 | 49 | 50 | 61 | 62 |
|----|----|----|----|----|----|----|----|
| 3  | 4  | 15 | 16 | 51 | 52 | 63 | 64 |
| 9  | 10 | 5  | 6  | 57 | 58 | 53 | 54 |
| 11 | 12 | 7  | 8  | 59 | 60 | 55 | 56 |
| 33 | 34 | 45 | 46 | 17 | 18 | 29 | 30 |
| 35 | 36 | 47 | 48 | 19 | 20 | 31 | 32 |
| 41 | 42 | 37 | 38 | 25 | 26 | 21 | 22 |
| 43 | 44 | 39 | 40 | 27 | 28 | 23 | 24 |

MEM(8) for parallel processing mode

INFORMATION PROCESSING APPARATUS, INFORMATION PROCESSING METHOD AND A COMPUTER PROGRAM

CROSS REFERENCE TO RELATED APPLICATIONS

This application is a National Stage of International Application No. PCT/JP2016/000465 filed Jan. 29, 2016.

FIELD

The present invention relates to an information processing apparatus, base station, an information processing method and a computer program, and more particularly to an information processing apparatus that uses matrix inversion calculation in signal processing, base station, an information processing method and a computer program.

BACKGROUND

FIG. 17 shows a base station and user terminals in MU-MIMO (Multiple User-Multiple Input Multiple Output) architecture. As shown in FIG. 17, the user number K is variable since the coverage area of one base station is fixed and the users are not fixed. The size of matrix for the precoding matrix generator is determined by the user number K.

Matrix inversion (MI) is widely used in signal processing, especially in the wireless communication area. In some cases, the size of the matrix for MI processing is variable.

For example, in the MU-MIMO technology, the zero-forcing (ZF) precoding involves the calculation as shown in the equation (Math.1).

$$W = H^H(HH^H)^{-1} \qquad \text{[Math. 1]}$$

In the equation (Math.1), W is the precoding matrix, H is the channel matrix. The size of H is variable according to the number of involved users.

Patent Literature 1 (PTL1) discloses a channel matrix calculation device for efficiently performing the inverse matrix calculation operation of a channel matrix by systematization. According to Patent Literature 1, a channel matrix calculation device enables a transmission/reception antenna to be compatible with an M×N system in a multi-carrier system MIMO system.

Patent Literature 2 (PTL2) discloses another channel matrix calculation device which can calculate channel matrixes of all subcarriers within an OFDM (Orthogonal Frequency Division Multiplexing) symbol period and enables transmission reception antennas to be adaptive to an M×N system.

Patent Literature 3 (PTL3) discloses a recursive calculation method of the channel matrix for the MIMO equalizer. Patent Literature 4 (PTL4) discloses a technique for relatively accurately detecting positional displacement between plural images while suppressing an operation load.

[PTL 1]
Japanese Patent Laid-open Publication No. JP-2007-13455A
[PTL 2]
Japanese Patent Laid-open Publication No. JP-2006-229436A
[PTL 3]
Japanese Patent Laid-open Publication No. JP-2009-524291A
[PTL 4]
Japanese Patent Laid-open Publication No. JP-2012-123652A

SUMMARY

The variable matrix size brings challenges in hardware implementation. The hardware implementation here includes but not limits to the ASIC (Application Specific Integrated Circuit) design, FPGA (Field Programmable Gate Array) implementation, DSP (Digital Signal Processor) implementation, general CPU (Central Processing Unit) based implementation and so on. In general, there are two ordinary solutions.

The first solution is preparing dedicated hardware for different matrix size. FIG. 18 illustrates an example of the first solution. Box 100 indicates the total hardware of the first solution wherein the maximum matrix size is 4. Within hardware 100, there are 4 processing blocks. Processing block 101 shows used for calculation of matrix inversion with matrix size 1. Processing block 102 is used for calculation of matrix inversion with matrix size 2. Processing block 103 is used for calculation of matrix inversion with matrix size 3. Processing block 104 is used for calculation of matrix inversion with matrix size 4.

In the first solution for certain matrix size, only the corresponding block works, and other blocks can be switched off for saving power. The demerit of the first solution is that it needs a lot of hardware for the whole system. Namely, the first solution waste much hardware cost to cover different cases with different matrix size.

The second solution is preparing the hardware only for the maximum matrix size. When the size of input matrix is less than the maximum matrix size, the input matrix is combined with the identity matrix so as to make the matrix size in the processing block is always the same. FIG. 19 illustrates an example of the second solution. 200 is the total hardware of the second solution wherein the maximum matrix size is 4. Within 200, there is a preprocessing block 201 and the processing block 104 which is used for calculation of matrix inversion with matrix size 4. When the input matrix size is 2, the input matrix is combined with the size 2 identity matrix in the preprocessing block 201. The Matrix size in 104 is still 4.

In the second solution, the total hardware cost is much less than the first solution since it only needs to provide the hardware for the maximum matrix size. The demerit of the second solution is that when the matrix size is less than the maximum matrix size, the power consumption is larger than the first solution.

Thus, both of two solutions have the disadvantages. A better solution is total hardware resource is fixed just for the maximum matrix size, and the power consumption can be adaptive to the matrix size.

In order to realize the solution with fixed hardware resource and adaptive power consumption, the matrix inversion method with matrix partition can be applied to implementation.

$$H = \begin{bmatrix} A & B \\ C & D \end{bmatrix} \qquad \text{[Math. 2]}$$

If the matrix H is partitioned into 4 blocks A, B, C and D as equation (Math.2), the matrix inversion $H^{-1}$ can be calculated as equation (Math.3).

$$H^{-1} = \begin{bmatrix} E & F \\ G & H \end{bmatrix}$$ [Math. 3]

$$E = (A - BD^{-1}C)^{-1}$$

$$F = -A^{-1}B(D - CA^{-1}B)^{-1}$$

$$G = -D^{-1}C(A - BD^{-1}C)^{-1}$$

$$H = (D - CA^{-1}B)^{-1}$$

In this way, the matrix inversion with larger size can be partitioned into matrix inversion with smaller size.

In the implementation of equation (Math.3), the hardware of the whole matrix inversion is divided into small blocks, which makes it possible to switch off the unnecessary blocks when the input matrix size is less than the maximum matrix size.

Some patent literatures have utilized this feature. Patent Literature 2 gives the implementation architecture of the matrix partition for matrix inversion with matrix size that is restricted to 2, 3 or 4. Patent Literature 1 adds the rank judgment block based on Patent Literature 2 in order to avoid computation overflow during the matrix partition. Patent Literature 4 states that the matrix inversion with larger size is partitioned into matrix inversion with smaller size in the image processing.

However, there is no general implementation architecture which can adapt to arbitrary matrix size in the MU-MIMO communication system.

It is an object of the present invention to contribute to provide an information processing apparatus, base station, an information processing method and a computer program which can adapt to arbitrary matrix size in the MU-MIMO communication system.

According to a first aspect, there is provided an information processing apparatus, comprising: a matrix inversion calculating unit that includes a higher level matrix inversion processing block containing at least four lower level matrix inversion processing blocks, and two assistant processing blocks and; a control unit that reconfigures an internal structure of the matrix inversion calculating unit depending on the input matrix size.

According to a second aspect, there is provided a base station comprising: a matrix inversion calculating unit that includes a higher level matrix inversion processing block containing at least four lower level matrix inversion processing blocks, and two assistant processing blocks and; a control unit that reconfigures an internal structure of the matrix inversion calculating unit depend on the input matrix size.

According to a third aspect, there is provided an information processing method for an information processing apparatus comprising a matrix inversion calculating unit that includes a higher level matrix inversion processing block containing at least four lower level matrix inversion processing blocks and two assistant processing blocks, and a control unit, said information processing method comprising: reconfiguring the internal structure of the matrix inversion calculating unit depending on the input matrix size; and calculating the matrix inversion using said matrix inversion calculating unit. This method is tied up with a particular machine that is an information processing apparatus for calculating the matrix inversion with variable matrix size.

According to a fourth aspect, there is provided a computer program causing a computer, which configures an information processing apparatus comprising a matrix inversion calculating unit that includes a higher level matrix inversion processing block containing at least four lower level matrix inversion processing blocks and two assistant processing blocks and a control unit, to execute: reconfiguring the internal structure of the matrix inversion calculating unit depending on the input matrix size; and calculating the matrix inversion using said matrix inversion calculating unit. This program may be recorded on a computer-readable storage medium. That is, the present invention may be embodied as a computer program product.

The meritorious effects of the present invention are summarized as follows.

According to the present invention, a general implementation architecture for the MU-MIMO communication system, adapting to arbitrary matrix size is provided.

BRIEF DESCRIPTION OF DRAWINGS

FIG. 8 is a schematic diagram illustrating the example of the matrix data storing order with matrix size 8 for power saving mode.

FIG. 13 is a schematic diagram illustrating the example of the matrix data storing order with matrix size 4 for parallel processing mode.

FIG. 14 is a schematic diagram illustrating the example of the matrix data storing order with matrix size 8 for parallel processing mode.

PREFERRED MODES

First Exemplary Embodiment

Figure 1:
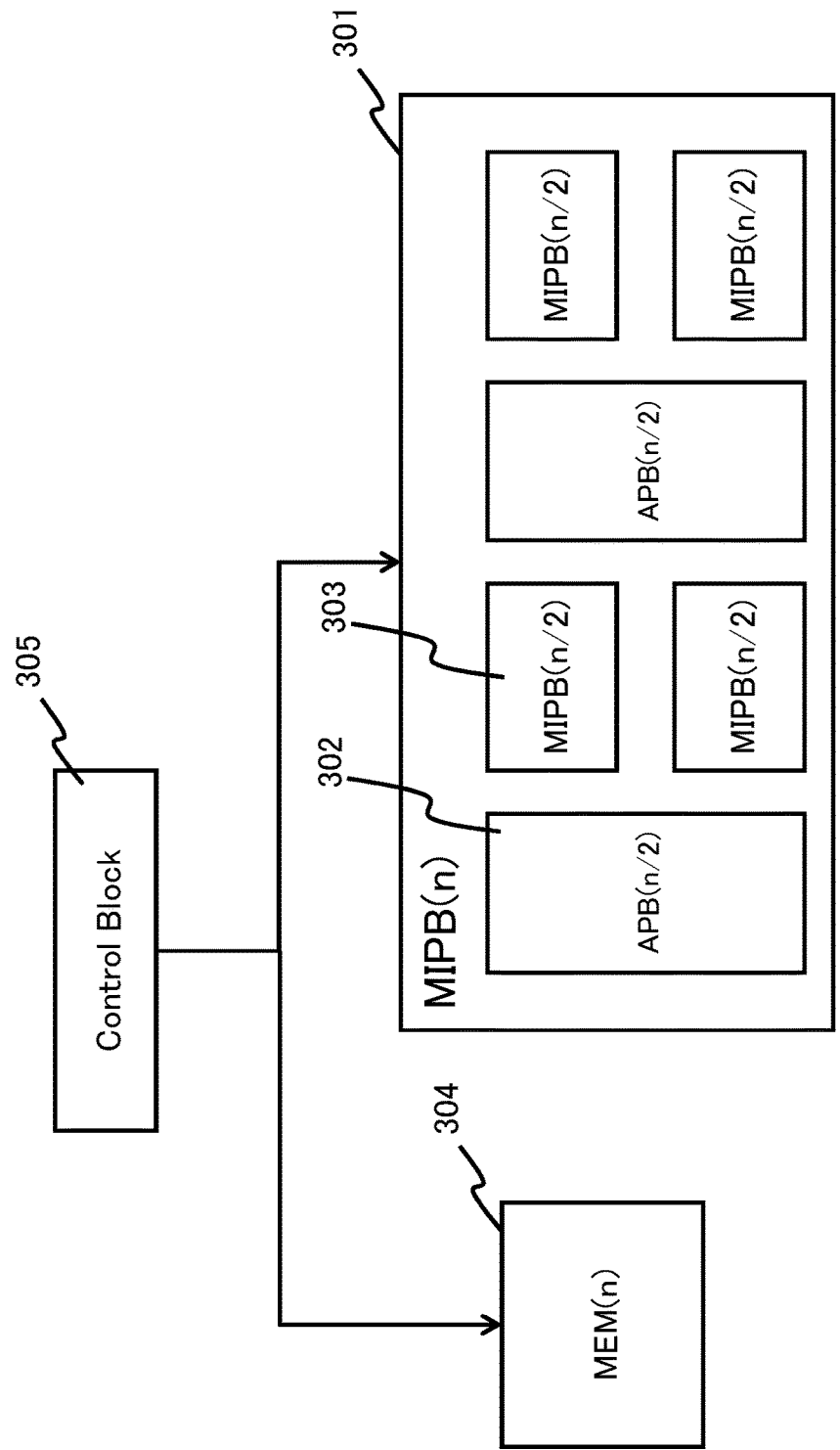
FIG. 1 is a schematic diagram illustrating the proposed recursive structure for the matrix inversion calculation.

Next, a first exemplary embodiment of the present disclosure will be described more in detail below with reference to the drawings. FIG. 1 illustrates the block diagram of the recursive architecture in an information processing apparatus. The matrix inversion processing block (MIPB) 301 and 303 are for calculating the matrix inversion. The denotation (n) means that the matrix size is n=2 m, m is arbitrary natural number. The assistant processing block (APB) is for other processing except the matrix inversion in equation (3). In this description, the "recursive" means an arbitrary level MIPB applies the same operation on a result by lower level MIPB to generate the next result. In other words, MIPBs are constituted in nesting style to execute "recursive" operation.

The first exemplary embodiment of MIPB(n) 301 is made up of 4 MIPB(n/2) 303 and 2 APB(n/2) 302. In the same recursive manner, if n is no less than 8, each MIPB(n/2) 303 can be divided into 4 MIPB(n-2) and 2 APB(n-2) furthermore.

The memory (MEM) 304 is used to store the matrix data which is to be processed in the MIPB 301. The memory here can be implemented in many forms, including the static random access memory (SRAM) and registers in ASIC implementation, the block memory and registers in FPGA implementation, the dynamic random access memory (DRAM) in general purpose processor based implementation, and so on.

The control block 305 is used receive the outside signals and make the reconfiguration of the MEM(n) 304 and MIPB(n) 301, which enable the whole architecture can be dynamically reconfigured for different situations and requirements.

As the implementation can be realized in many platforms, the dynamic reconfiguration can be implemented in many methods. For ASIC implementation, it can be implemented by clock gating technology and power gating technology. For FPGA implementation, it can be implemented by clock gating and partial reconfiguration technology in the FPGA chips, such as Stratix V (Trademark) FPGAs produced by Altera (Trademark). It can also be implemented by some special engines, such as the DRP core produced by Renesas (Trademark).

Figure 2:
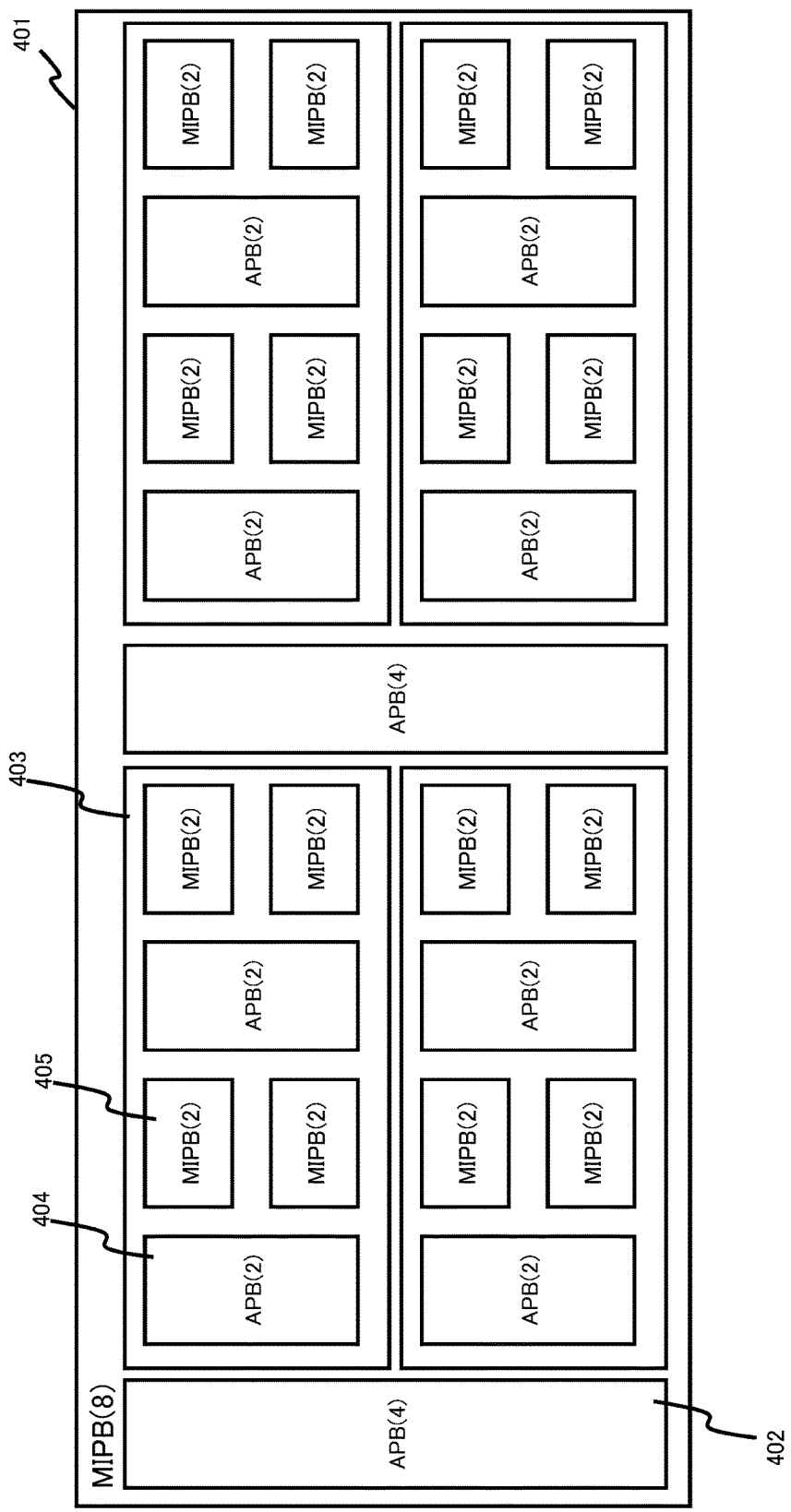
FIG. 2 is a schematic diagram illustrating the example of recursive structure with matrix size 8.

Here, the reconfiguration of the MIPB(n) by the control block 305 will be described more in detail. FIG. 2 illustrates the example of the structure of matrix inversion processing block with matrix size 8. The MIPB(8) 401 for matrix size 8 is composed of 4 MIPB(4) 403 and 2 APB(4) 402. Each MIPB(4) for matrix size 4 is composed of 4 MIPB(2) 405 and 2 APB(2) 404. MIPB(2) for matrix size 2 can be simply implemented as the equation (Math. 4).

$$H = \begin{bmatrix} a & b \\ c & d \end{bmatrix}, H^{-1} = \frac{1}{ad-bc}\begin{bmatrix} d & -b \\ -c & a \end{bmatrix}$$  [Math. 4]

Figure 3:
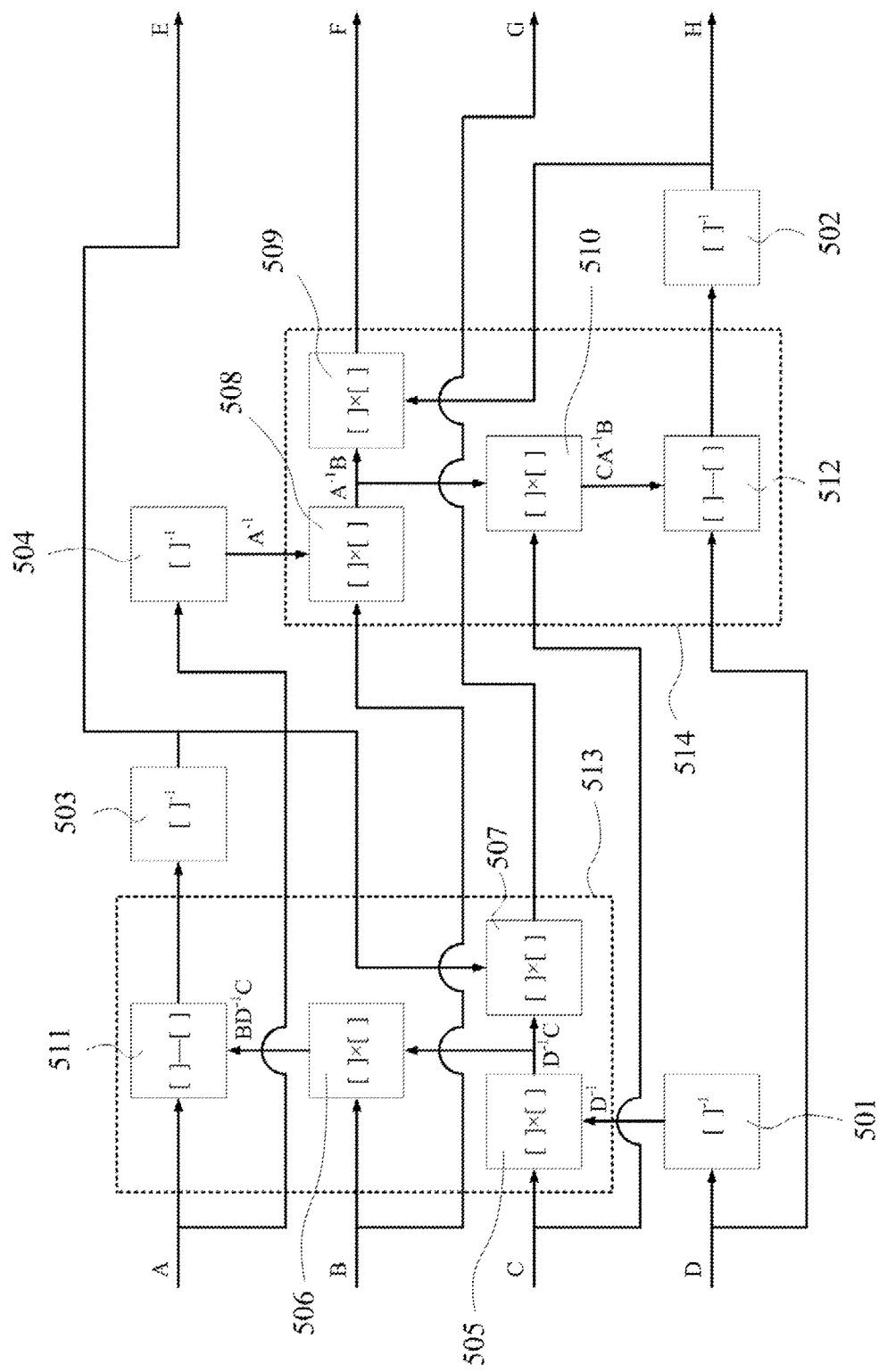
FIG. 3 is a schematic diagram illustrating the details of the recursive structure.

FIG. 3 illustrates the details of the proposed recursive architecture. The maximum input matrix size Nmax is power of 2, which is denoted as $2^m$, m is arbitrary natural number which larger than 2. The input matrix is divided equally into four submatrices A, B, C and D, the size of which is $2^{m-1}$. As the equation (Math.2), the input A is the left upper submatrix, input B is the right upper submatrix, input C is the left lower submatrix and input D is the right lower submatrix. The outputs E, F, G and H are according with the equation (Math.3).

In the recursive architecture, the MIPBs 501, 502, 503 and 504 are used for calculating the matrix inversion of the submatrices. As the position in the figure, the left upper MIPB is 503, the right upper MIPB is 504, the left lower MIPB is 501 and the right lower MIPB is 502. The matrix multiplication processing blocks (MMPBs) 505, 506, 507, 508, 509 and 510 are used for calculating the matrix multiplication of the submatrices. The matrix subtraction processing blocks (MSPBs) 511 and 512 are used for calculating the matrix subtraction of the submatrices. Therefore, there are 4 MIPBs, 6 MMPBs and 2 MSPBs in the recursive architecture. Except the MIPBs, the other processing blocks from the left APB 513 and the right APB 514. Namely, one APB is made up of 3 MMPBs and 1 MSPB.

The inputs of MSPB 511 are input A and output of MMPB 506. The output of MSPB 511 is fed into MIPB 503. The output of MIPB 503 is fed to output E and MMPB 507. The MIPB 501 receives the input D and outputs result to MMPB 505. The MMPB 505 multiplies the input C and result from MIPB 501, and output the result to both MMPB 506 and 507. MMPB 506 multiplies the input B and result from MMPB 505, and output the result to MSPB 511. The MMPB 507 multiplies the result from MIPB 503 and result from MMPB 505, and output the result as the output G.

The inputs of MSPB 512 are input D and output of MMPB 510. The output of MSPB 512 is fed into MIPB 502. The output of MIPB 502 is fed to output H and MMPB 509. The MIPB 504 receives the input A and outputs result to MMPB 508. The MMPB 508 multiplies the input B and result from MIPB 504, and output the result to both MMPB 509 and 510. MMPB 510 multiplies the input C and result from MMPB 508, and output the result to MSPB 512. The MMPB 509 multiplies the result from MIPB 502 and result from MMPB 508, and output the result as the output F.

Thus, the input A is fed into the left APB 513 and right upper MIPB 504. The inputs B and C are fed into both of the APBs 513 and 514. The input D is fed into the left lower MIPB 501 and the right APB 514. The output E comes from the left upper MIPB 503. The output F comes from the right APB 514. The output G comes from the left APB 513. The output H comes from the right lower MIPB 502.

When the matrix size is half of the maximum matrix size, the recursive architecture can work in the power saving mode. Namely, the FIG. 4 illustrates the power saving mode.

Figure 4:
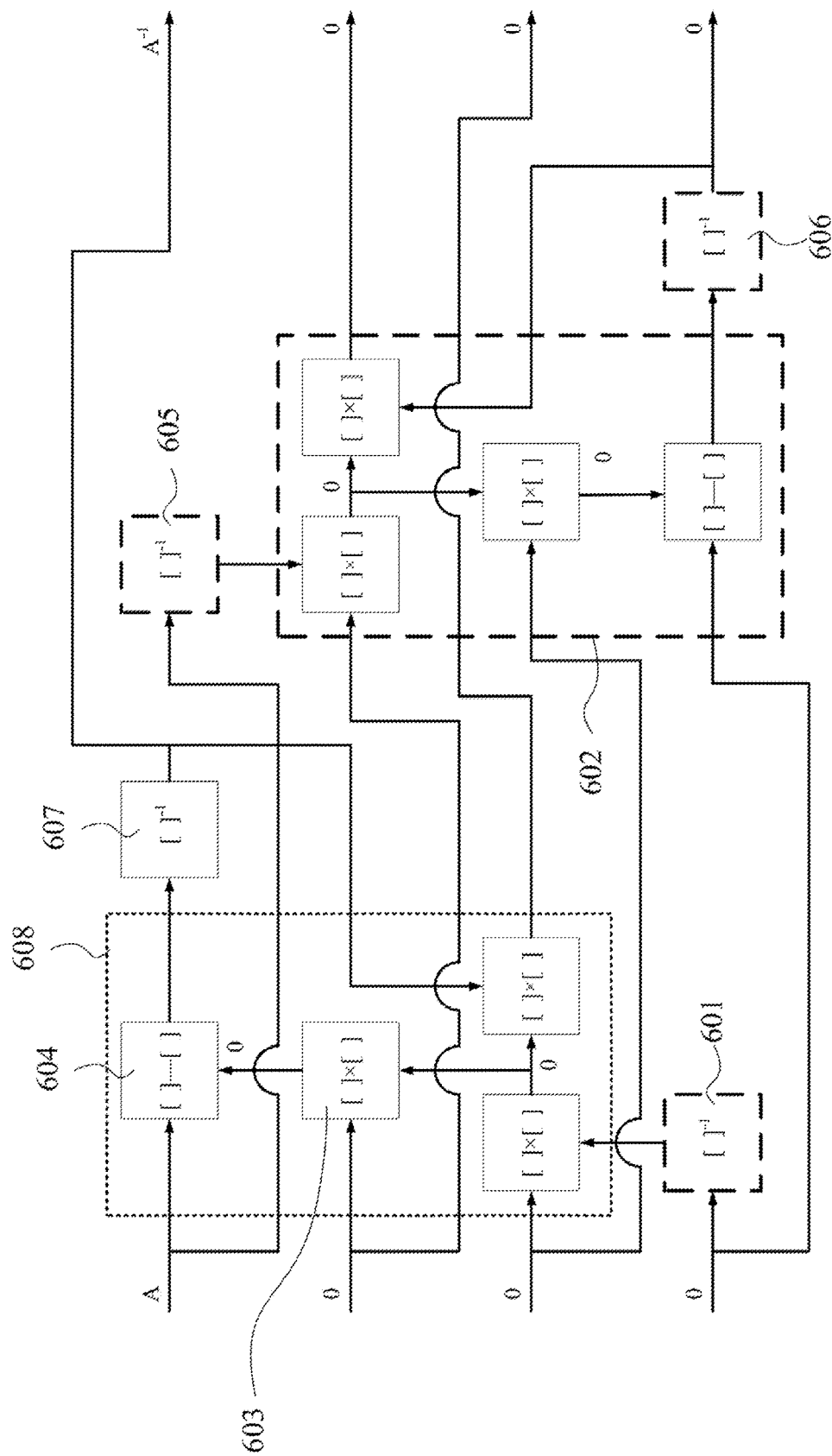
FIG. 4 is a schematic diagram illustrating the principle of the power saving mode.

The MIPB 601, 605 and 606, and the right APB 602 are switched off, which are illustrated by broken-line in FIG. 4. Only the left APB 608 and left upper MIPB 607 are on working state. Except input A, other input submatrices are all zero matrices. Thus, no matter what is the other input of the MMPB 603, the output is zero matrix. Since the other input is zero matrix, the output of MSPB 604 is the input A. Through the left upper MIPB 607, the required output A-1 is fed to the output.

The power saving mode of different input matrix size switch off different blocks. The examples of maximum matrix size 8 are described below.

Figure 5:
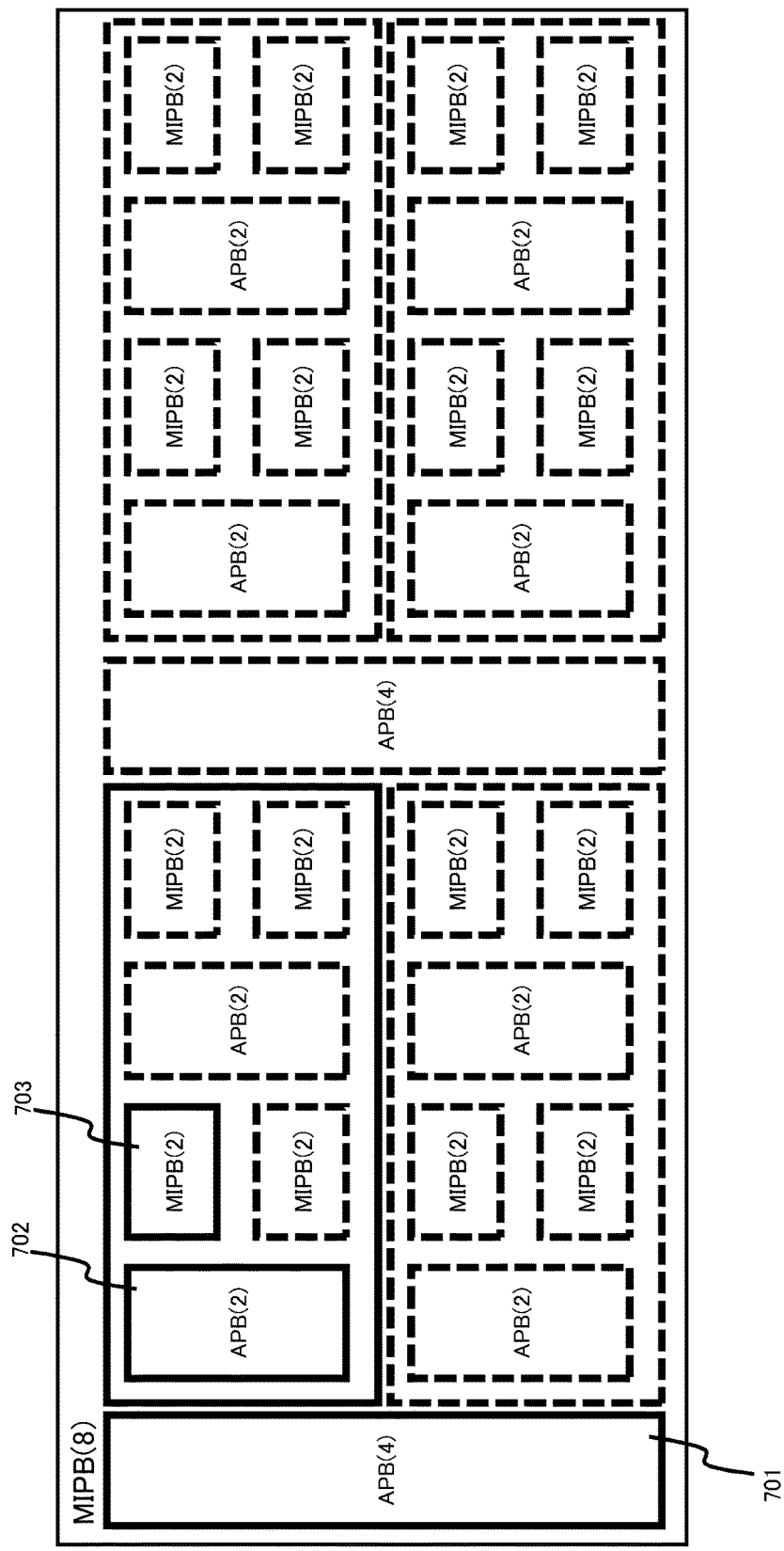
FIG. 5 is a schematic diagram illustrating the example of the power saving mode with input matrix size 2 and maximum matrix size 8.

FIG. 5 illustrates the example of input matrix size that is 2. The APB 701, 702 and MIPB 703 are in working state. The other processing blocks are switched off which are illustrated by broken-line.

Figure 6:
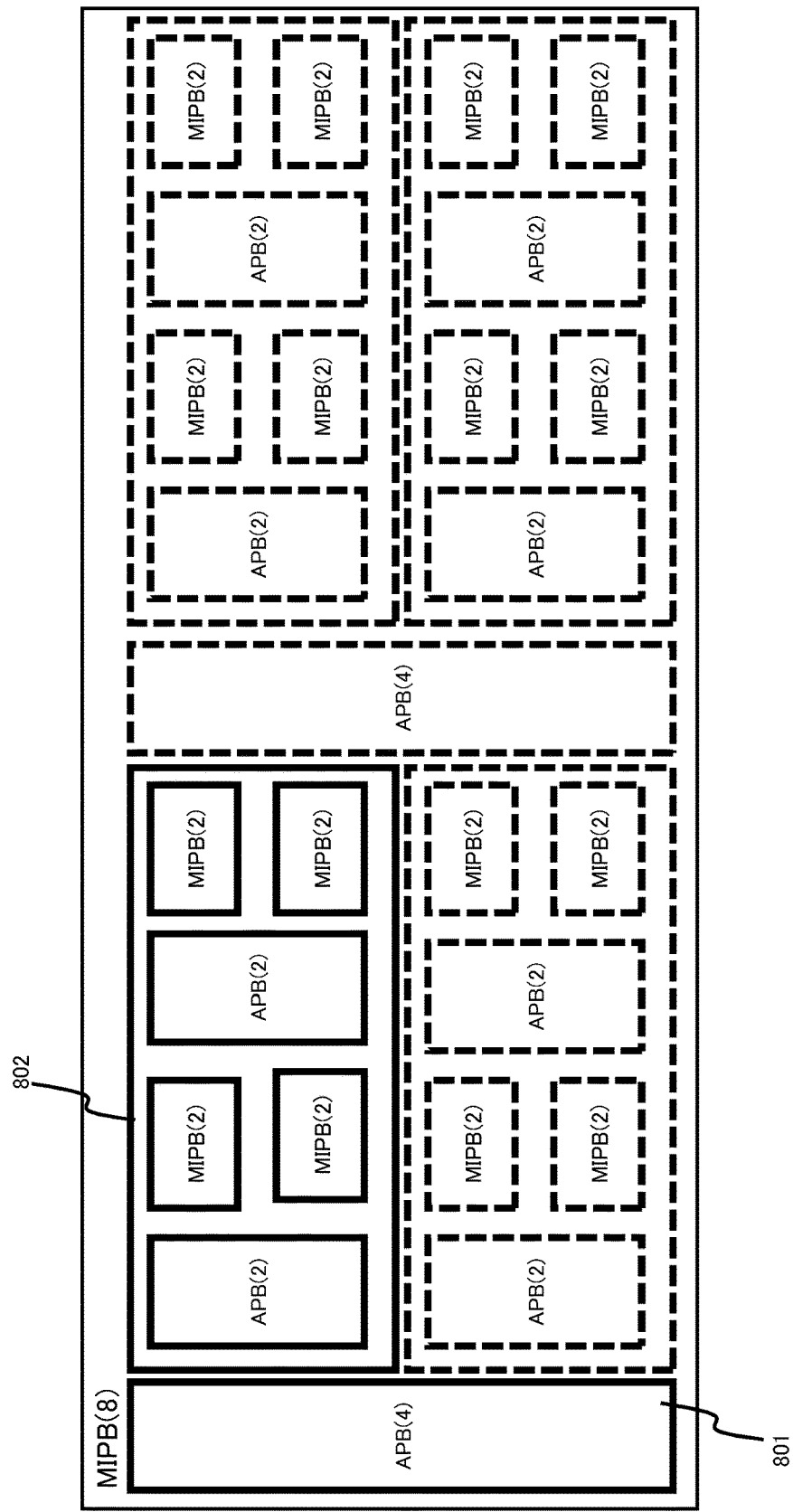
FIG. 6 is a schematic diagram illustrating the example of the power saving mode with input matrix size 3 and 4 and maximum matrix size 8.

FIG. 6 illustrates the example of input matrix size that is 3 and 4. The APB 801 and MIPB 802 are in working state. The other processing blocks are switched off which are illustrated by broken-line. For input matrix size 3, the identity matrix is combined to the input matrix so as to make the size of processing matrix as 4.

The cases with matrix size that is 5, 6, 7 and 8 do not apply the power saving mode. For input matrix size 5, 6 and 7, the identity matrix is combined to the input matrix so as to make the size of processing matrix as 8.

The first exemplary embodiment of power saving mode needs special data storing order, which guarantees that the data fetched from memory can be directly fed into the processing blocks without reordering. Here, the data storing order of the memory by the control block 305 will be described in detail.

Figure 7:
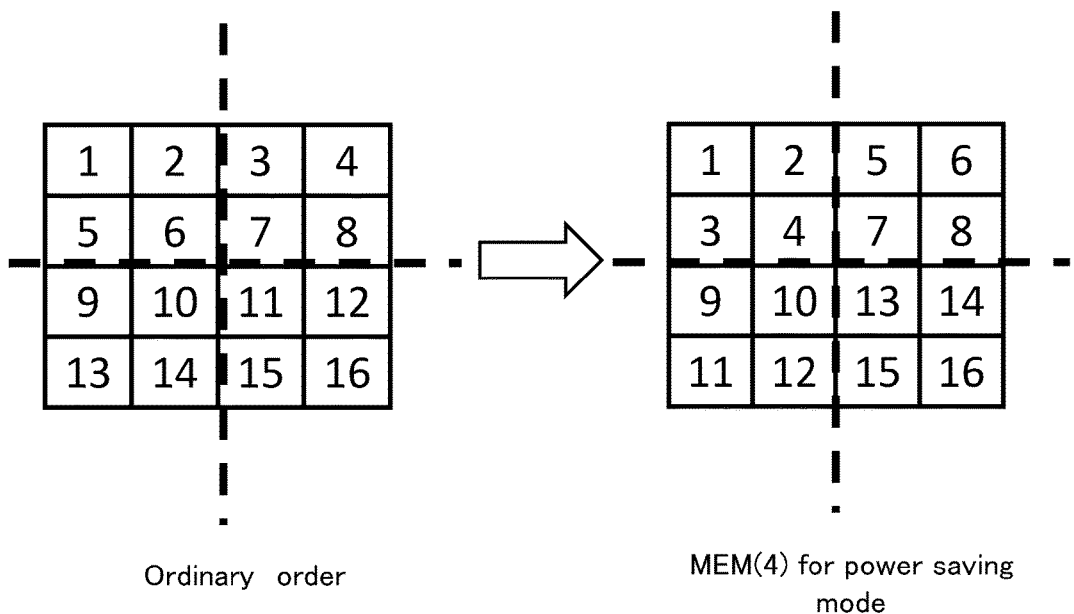
FIG. 7 is a schematic diagram illustrating an ordinary matrix data and the example of the matrix data storing order with matrix size 4 for power saving mode.

FIG. 7 illustrates the example of the ordinary order and special storing order of the case of maximum input matrix size 4. There are 16 data in the matrix, which are denoted as the corresponding order in storing. In the ordinary order, the data are arranged in the order that is from left to right and from top to bottom. In this order, the matrix is divided into four partitions for the partition processing. The data order fetched from the memory is 1, 2, 3, 4, 5, 6, . . . , 13, 14, 15, 16. And the data should be reordered to 1, 2, 5, 6, 3, 4, . . . , 11, 12, 15, 16 for the MIPB(2) and APB(2) in the MIPB(4). Thus, in order to avoid the reordering step, the data in the memory should be arranged as the MEM(4) order. The data of the left upper 2×2 block are firstly stored in the memory. The next is the right upper 2×2 block. The third is the left lower 2×2 block. The last is the right lower 2×2 block.

In the same way, since the matrix partition is in recursive manner, the special storing order of each submatrix is also in recursive manner.

FIG. 8 illustrates the storing order of the case of maximum input matrix size 8. There are 64 data in the matrix, which are denoted as the corresponding order in storing. The data of the left upper 4×4 block are firstly stored in the memory. The next is the right upper 4×4 block. The third is the left lower 4×4 block. The last is the right lower 4×4 block. In each 4×4 block, the data of the left upper 2×2 block are firstly stored in the memory. The next is the right upper 2×2 block. The third is the left lower 2×2 block. The last is the right lower 2×2 block.

In sum, the first exemplary embodiment of proposed architecture is adaptive to the variable matrix size for matrix inversion processing. Through the power saving mode, when the input matrix size is small, unnecessary power consumption is saved. The dedicated data storing order also avoids extra hardware cost.

Second Exemplary Embodiment

Next, a second exemplary embodiment of the present disclosure will be described more in detail. Since the second exemplary embodiment is as same as the first exemplary embodiment in the structure of the information processing apparatus, the following description will be made with a focus on the difference between the first and second exemplary embodiments.

Instead of the power saving mode, the second exemplary embodiment of the information processing apparatus can also apply the parallel processing mode, which does not switch off as many processing blocks as the power saving mode. The merit of parallel processing mode is that more than one matrix can be processed concurrently.

In the parallel processing mode, the control block 305 gives different control instructions to the memory and MIPB according to the input matrix size and external instructions.

Figure 9:
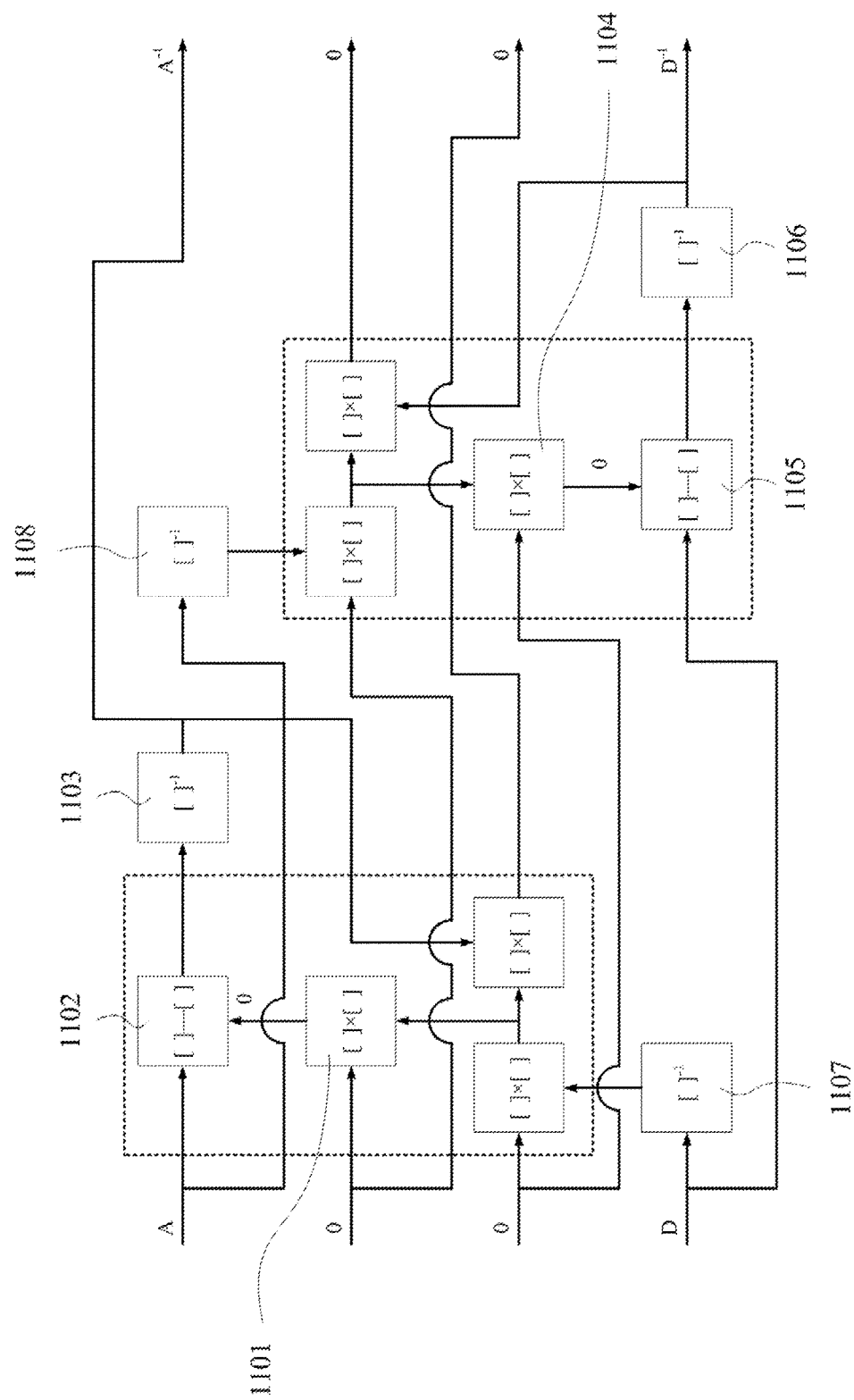
FIG. 9 is a schematic diagram illustrating the principle of the parallel processing mode.

FIG. 9 illustrates the parallel processing mode of the recursive architecture. Since one of the inputs of the MMPB 1101 is zero matrix, the output of this block is zero matrix. The output of MSPB 1102 is the input A. Through the left upper MIPB 1103, the required output A-1 is obtained. In the same process, since one of the inputs of the MMPB 1104 is zero matrix, the output of this block is zero matrix. The output of MSPB 1105 is the input D. Through the right lower MIPB 1106, the required output D-1 is obtained. The left lower MIPB 1107 and right upper MIPB 1108 are in switched off state.

The parallel processing mode of different input matrix size switch off different blocks and accommodate different parallel processing cases. The examples of maximum matrix size 8 are described below.

Figure 10:
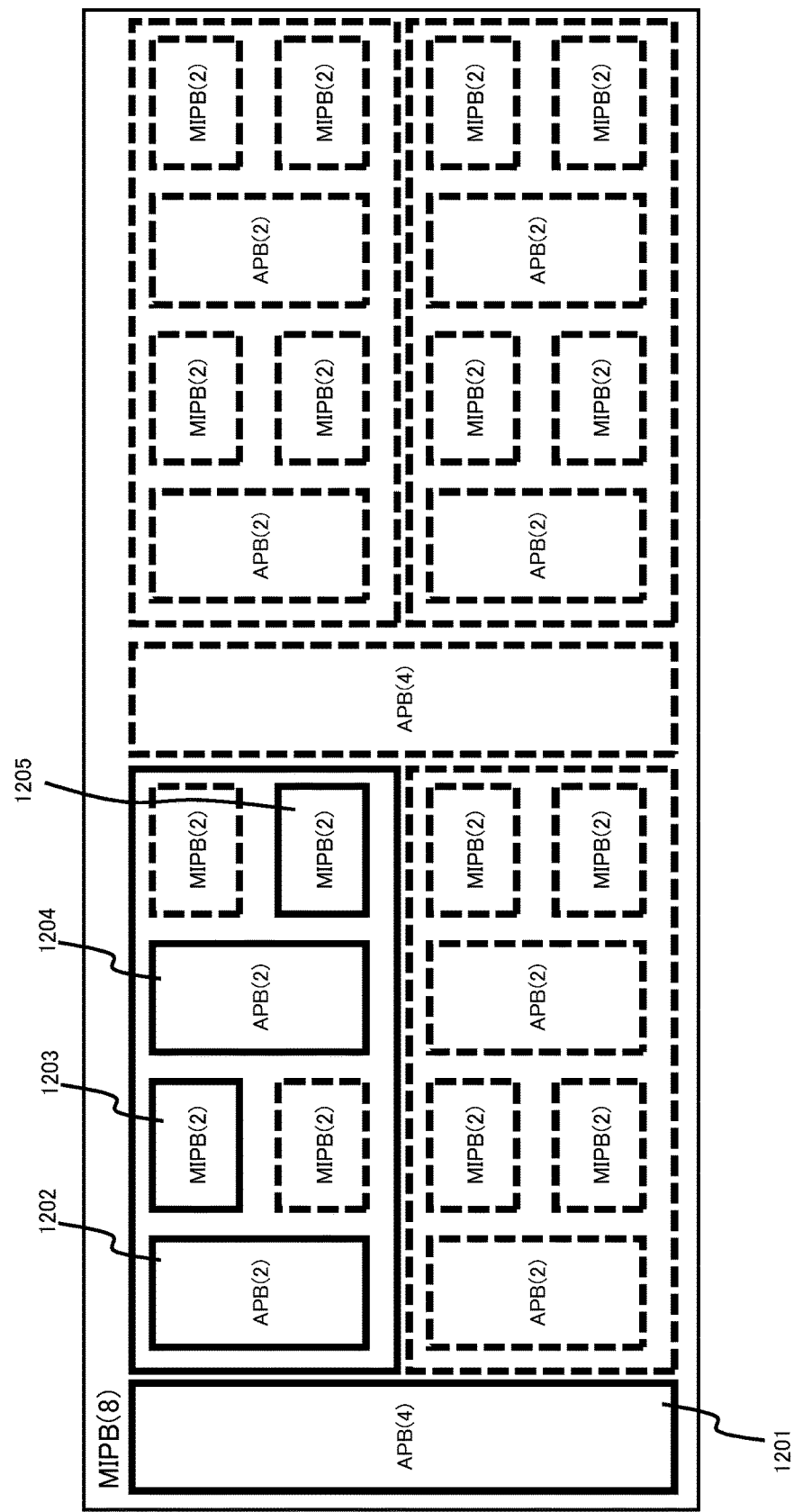
FIG. 10 is a schematic diagram illustrating the example of the parallel processing mode with input matrix size 2 and maximum matrix size 8 (2 matrices are working concurrently).
Figure 11:
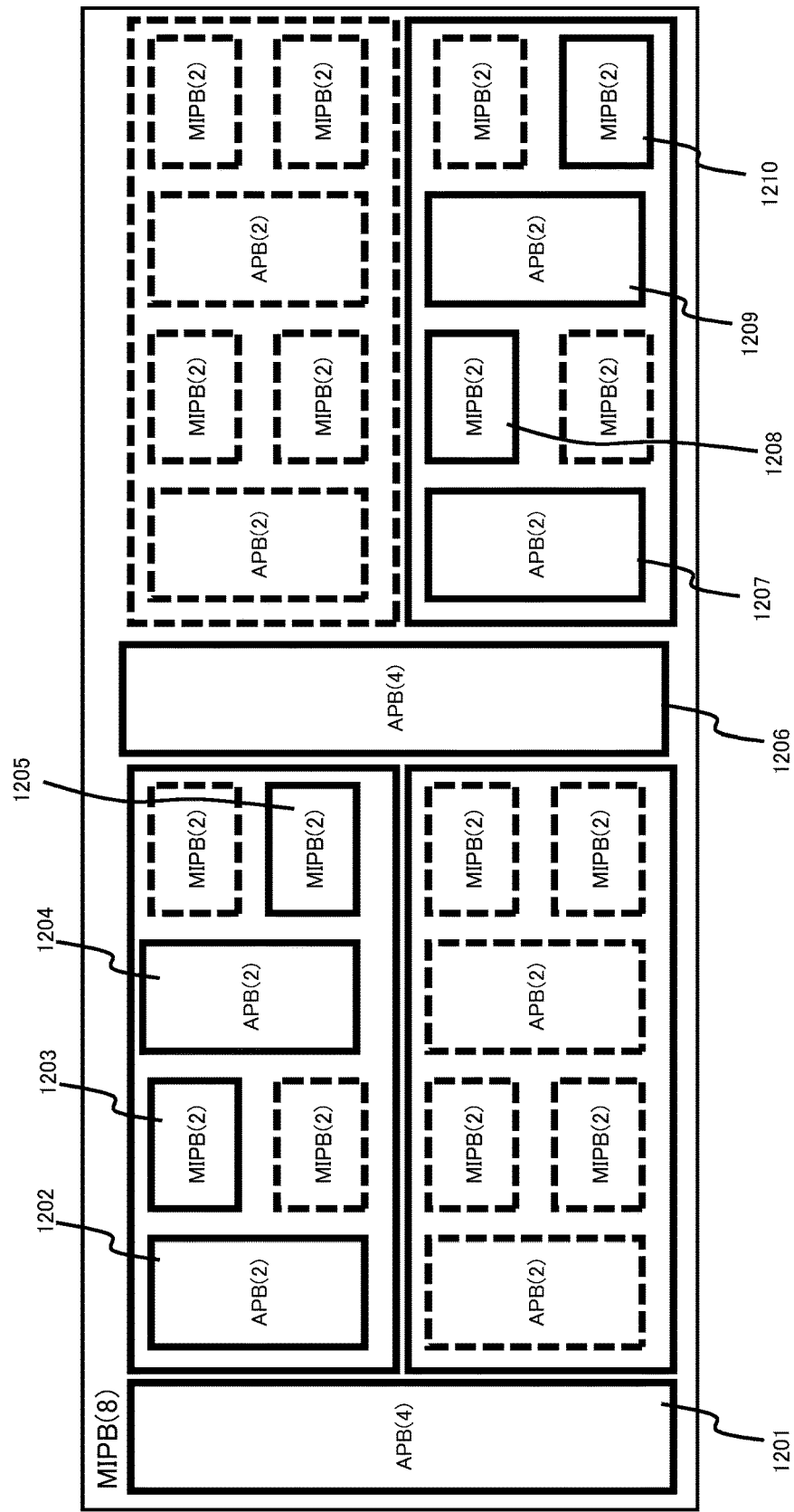
FIG. 11 is a schematic diagram illustrating the example of the parallel processing mode with input matrix size 2 and maximum matrix size 8 (4 matrices are working concurrently).

FIG. 10 illustrates the example of input matrix size that is 2. According to the application requirement, different parallel processing number can be configured. FIG. 10 shows that 2 matrices are processed concurrently. The APB 1201, 1202 and 1204, and MIPB 1203 and 1205 are in working state. The other processing blocks are switched off which are illustrated by broken-line. FIG. 11 shows that 4 matrices are processed concurrently. Beside the APB 1201, 1202 and 1204, and MIPB 1203 and 1205, the APB 1206, 1207 and 1209, and MIPB 1208 and 1210 are also in working state. The other processing blocks are switched off which are illustrated by broken-line.

Figure 12:
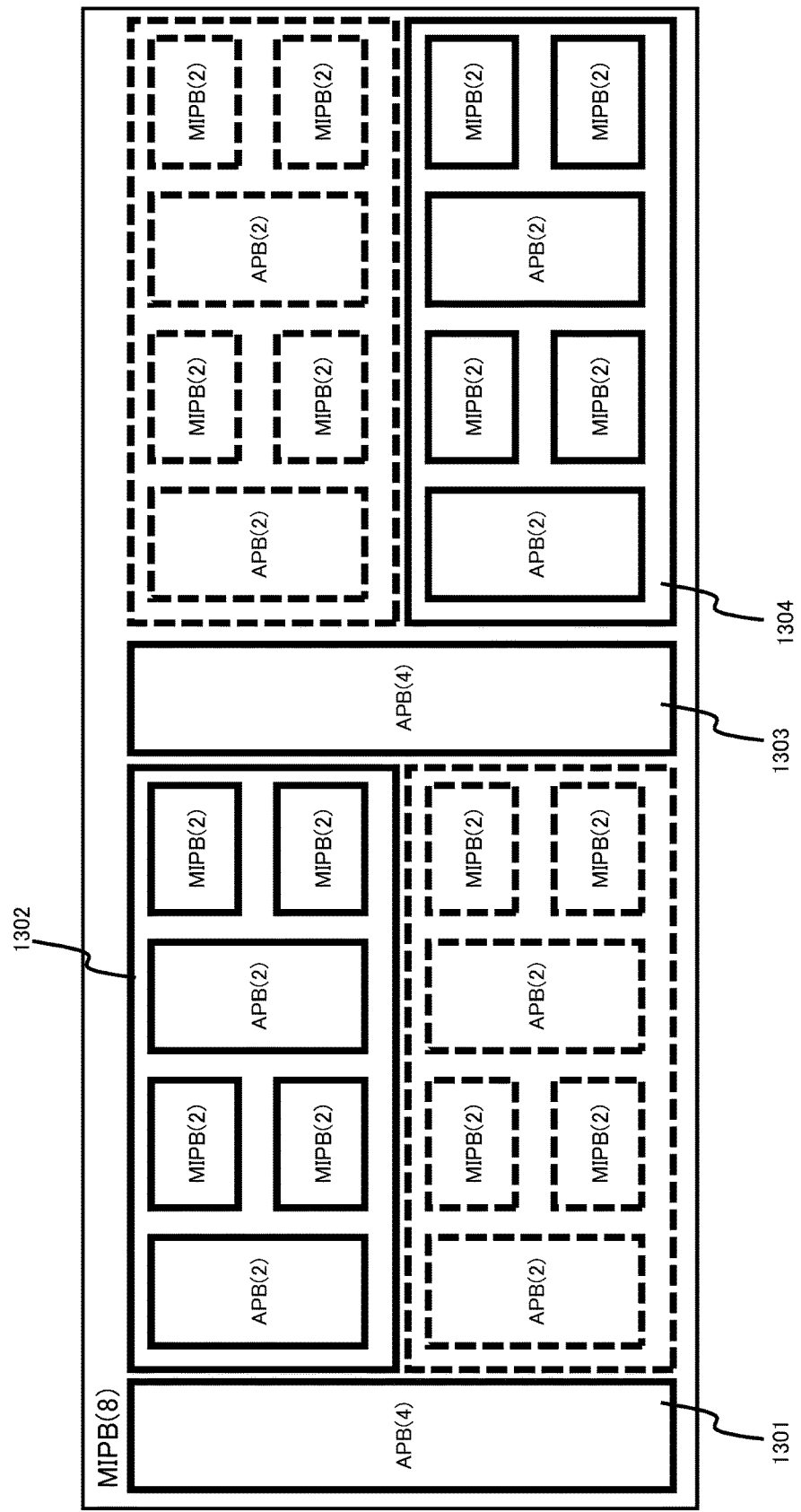
FIG. 12 is a schematic diagram illustrating the example of the parallel processing mode with input matrix size 3 and 4 and maximum matrix size 8.

FIG. 12 illustrates the example of input matrix size that is 3 and 4. The APB 1301 and 1303, and MIPB 1302 and 1304 are in working state. The other processing blocks are switched off which are illustrated by broken-line. In the configuration, 2 matrices can be processed concurrently. For input matrix size 3, the identity matrix is combined to the input matrix so as to make the size of processing matrix as 4.

The cases with matrix size that is 5, 6, 7 and 8 do not apply the parallel processing mode. For input matrix size 5, 6 and 7, the identity matrix is combined to the input matrix so as to make the size of processing matrix as 8.

Here, the data storing order of the memory by the control block 305 will be described in detail. As the power saving mode, the parallel processing mode also needs special data storing order, which is storing the data of each submatrix in recursive manner. FIG. 13 illustrates the storing order of the case of maximum input matrix size 4. There are 16 data in the matrix, which are denoted as the corresponding order in storing. The data of the left upper 2×2 block are firstly stored in the memory. The next is the right lower 2×2 block. The third is the left lower 2×2 block. The last is the right upper 2×2 block.

FIG. 14 illustrates the storing order of the case of maximum input matrix size 8. There are 64 data in the matrix, which are denoted as the corresponding order in storing. The data of the left upper 4×4 block are firstly stored in the memory. The next is the right lower 4×4 block. The third is the left lower 4×4 block. The last is the right upper 4×4 block. In each 4×4 block, the data of the left upper 2×2 block are firstly stored in the memory. The next is the right lower 2×2 block. The third is the left lower 2×2 block. The last is the right upper 2×2 block.

In sum, in the parallel processing mode, since there are less blocks being switched off, the power saving effect is less than the power saving mode. The merit of second exemplary embodiment is that two or more smaller matrices can be processed at the same time, which can speed up the processing. The dedicated data storing order also avoids extra hardware cost.

Third Exemplary Embodiment

Next, a third exemplary embodiment of the present disclosure will be described more in detail. Since the second exemplary embodiment is as same as the first exemplary embodiment in the structure of the information processing apparatus, the following description will be made with a focus on the difference between the first and third exemplary embodiments.

Figure 15:
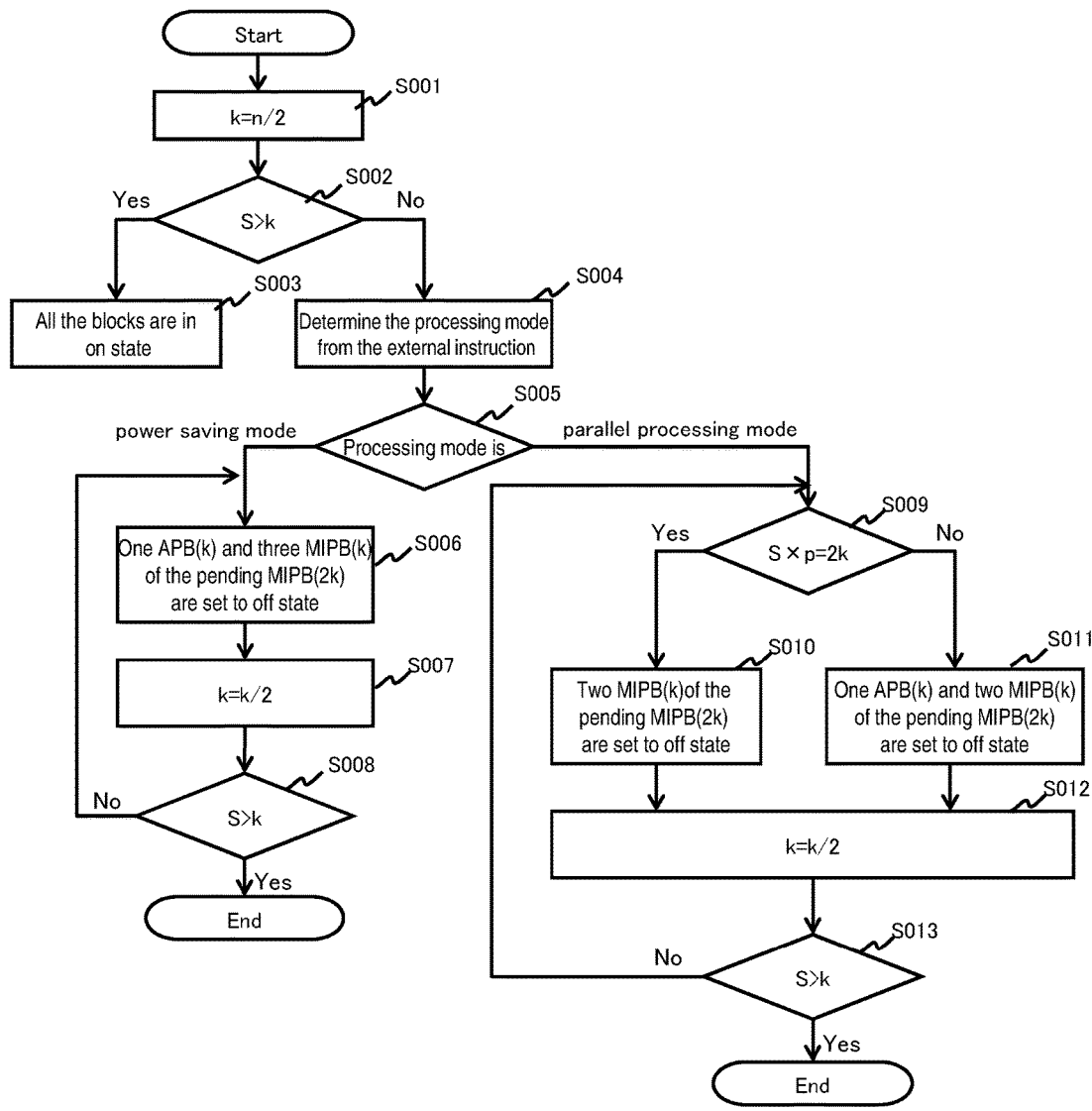
FIG. 15 is a flowchart showing an example of the operation of the case station of the present disclosure.

The third exemplary embodiment of the information processing apparatus enables both of the power saving mode and the parallel processing mode when the input matrix size is no more than half of the maximum matrix size. FIG. 15 illustrates the processing flow of determining the processing mode and the on/off state of the processing blocks.

In FIG. 15, the input matrix size is denoted as S, which is an external input. The parallelism factor P is the number of concurrent processing matrices, which is an external input. n is the maximum matrix size, which is an external input. k is the variable parameter for recursive representation of the structure. There is another external input which determines the system is working in power saving mode or parallel processing mode.

As shown in FIG. 15, if the input matrix size is larger than the half of the maximum matrix size (step S001 and S002), all the processing blocks are in on state (step S003). If the input matrix size is smaller than or equal to the half of the maximum matrix size, the system should determine the mode according to the external instruction (step S004 and S005).

When the power saving mode is determined, one APB(k) and three MIPB(k) of the pending MIPB(2 k) are set to off state (step S006). The variable k is divided by 2 (step S007). If the input matrix size S is still less than or equal to the variable k (No in step S008), the setting is return back as a recursive process (return to step S006), otherwise the setting process is ended.

When the parallel saving mode is determined, both the matrix size S and the externally determined parallelism factor P are considered in the setting process. If the product of S and P is equal to 2 k (Yes in step S009), two MIPB(k) of the pending MIPB(2 k) are set to off state (step S010), otherwise one APB(k) and two MIPB(k) of the pending MIPB(2 k) are set to off state (step S011). The variable k is divided by 2 (step S012). If the input matrix size S is still less than or equal to the variable k (No in step S013), the setting is return back as a recursive process (return to step S009), otherwise the setting process is ended.

As described above, according to the third exemplary embodiment, it is possible to switch the power saving mode in the first embodiment and the parallel processing mode in the second embodiment based on the external instruction.

Figure 20:
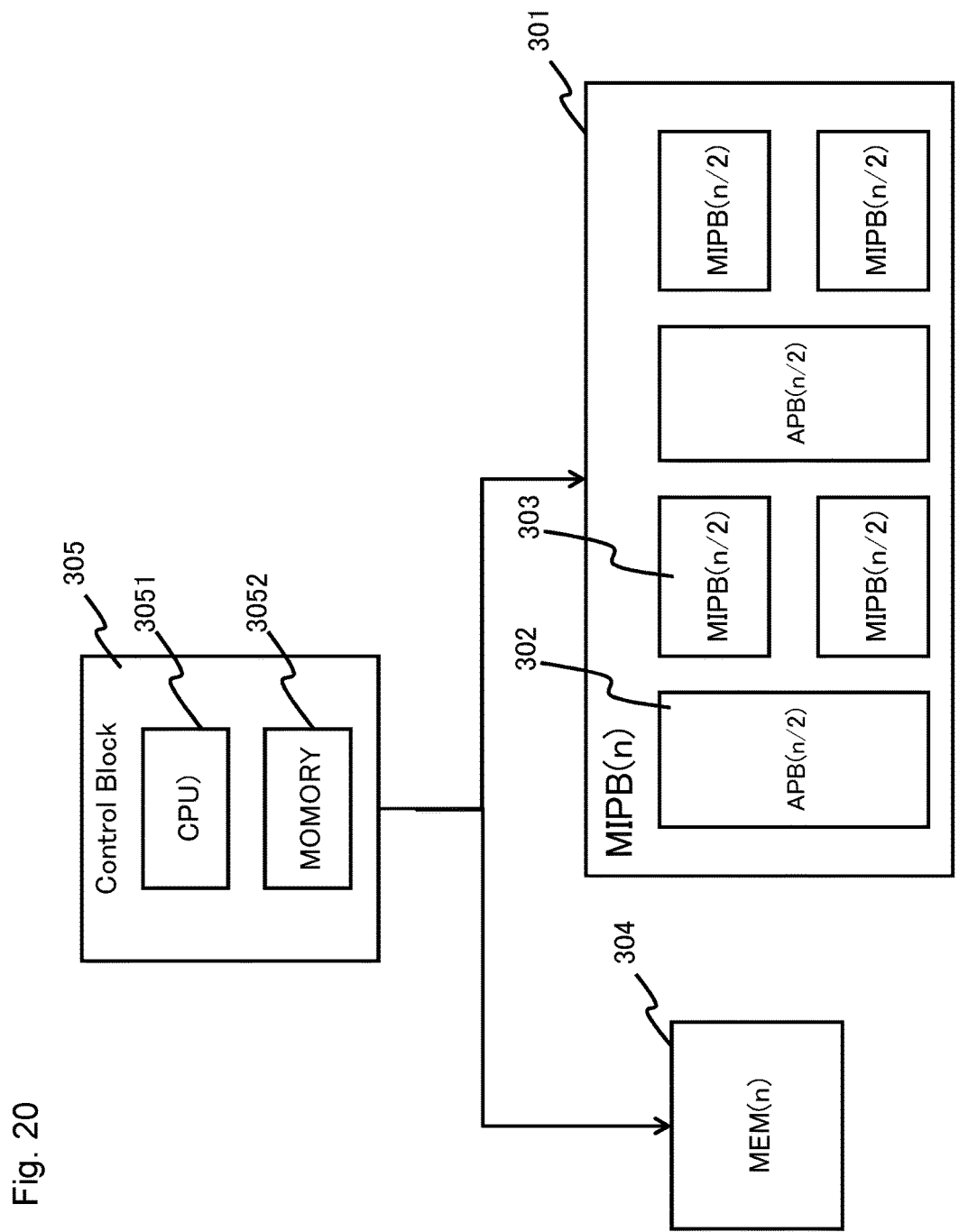
FIG. 20 is a schematic diagram illustrating the alternative embodiment of present disclosure.

Further, the function of the control block 305 can be realized by dedicated circuit unit performing processes shown in FIG. 15. Furthermore, the function of the control block 305 can be realized by a non-transitory computer-readable recording medium storing a computer program. FIG. 20 shows this alternative embodiment. A memory 3052 in the control block 305 stores a inputted computer program to perform processes shown in FIG. 15. A CPU 3051 in the control block 305 reads the computer program from the memory 3052 and executes the processes shown in FIG. 15.

While the preferred exemplary embodiment of the present invention has been described, it is to be understood that the present invention is not limited to the exemplary embodiment above and that further modifications, replacements, and adjustments may be added without departing from the basic technical concept of the present invention.

Figure 16:
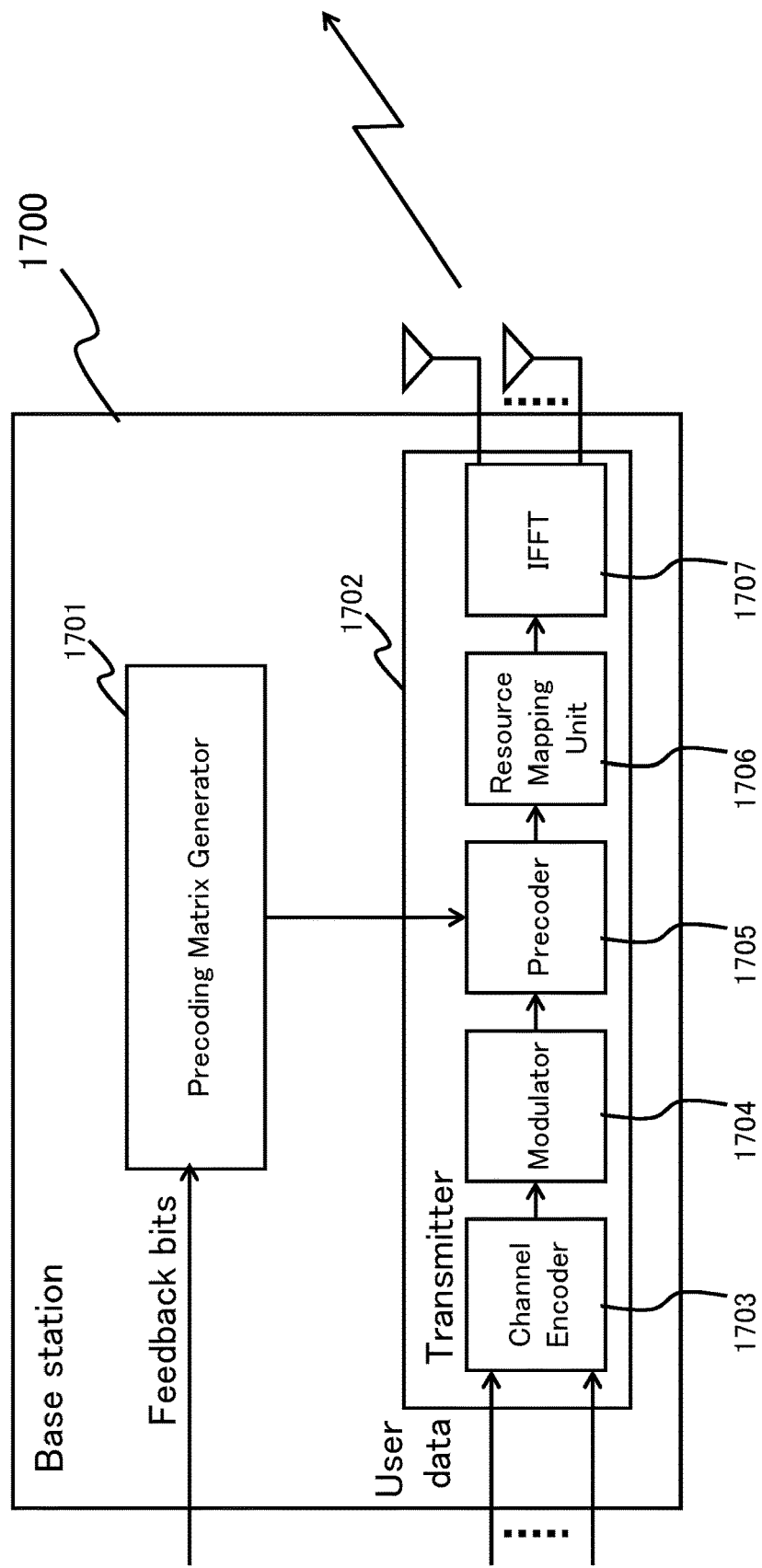
FIG. 16 is a block diagram showing the detailed configuration of a base station having the proposed recursive architecture.
Figure 17:
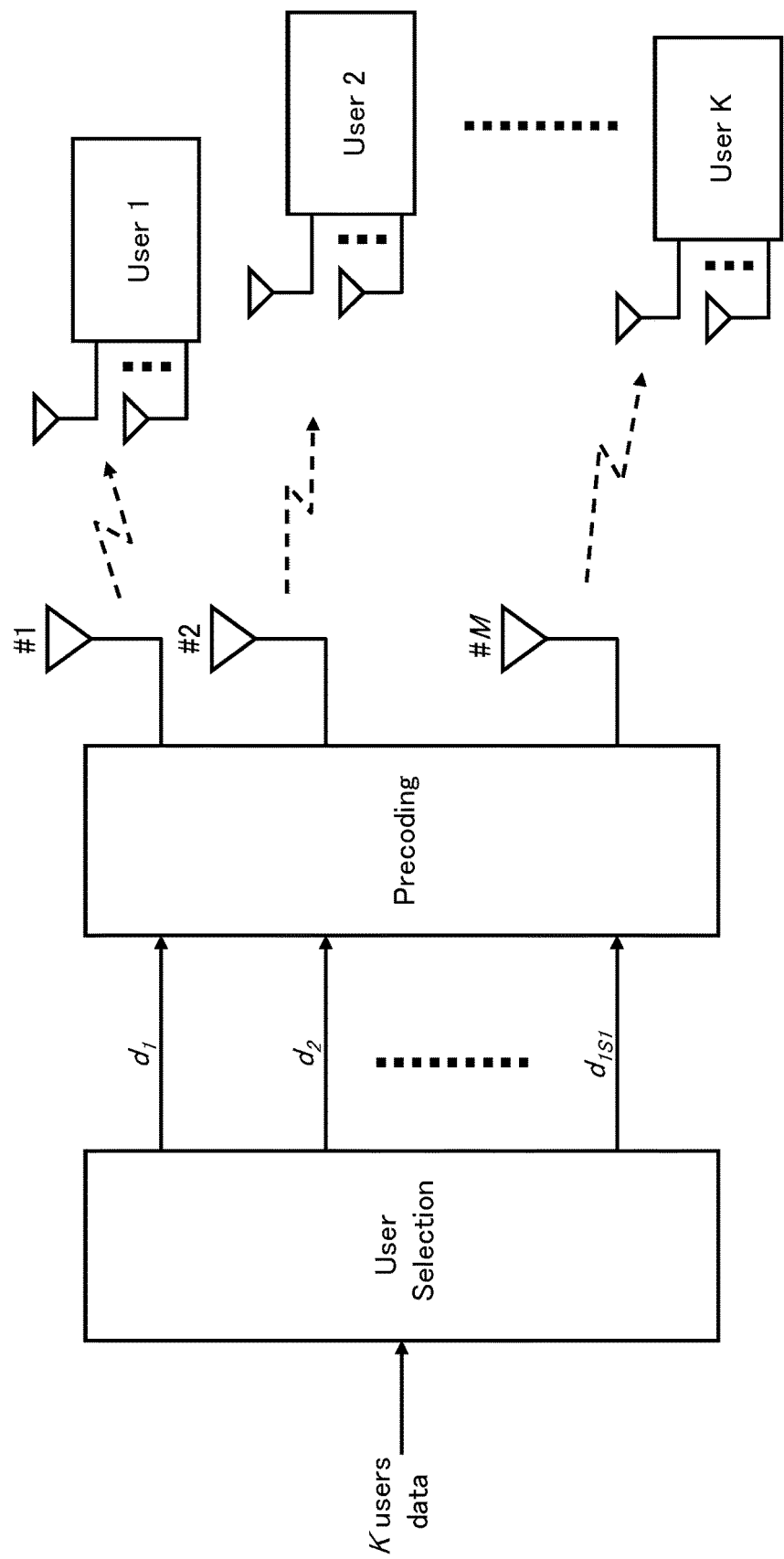
FIG. 17 is a schematic diagram illustrating a base station in MU-MIMO (Multiple User-Multiple Input Multiple Output) architecture.
Figure 18:
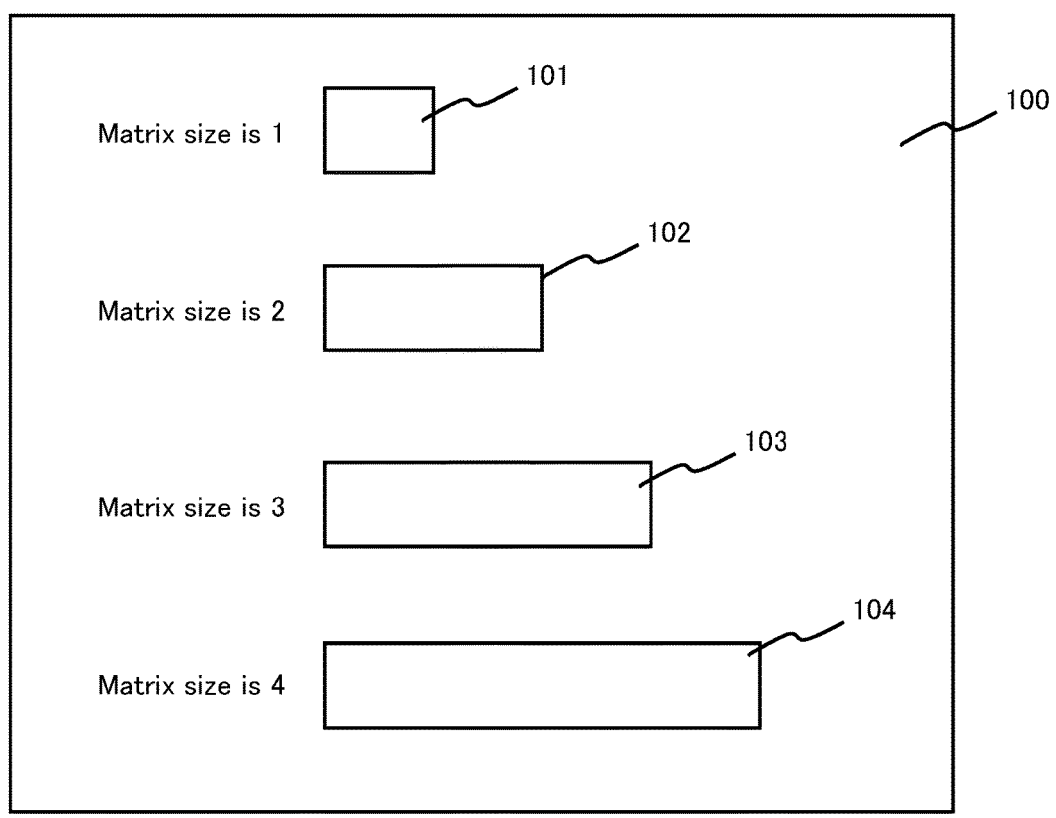
FIG. 18 is a schematic diagram illustrating the first solution described as background.
Figure 19:
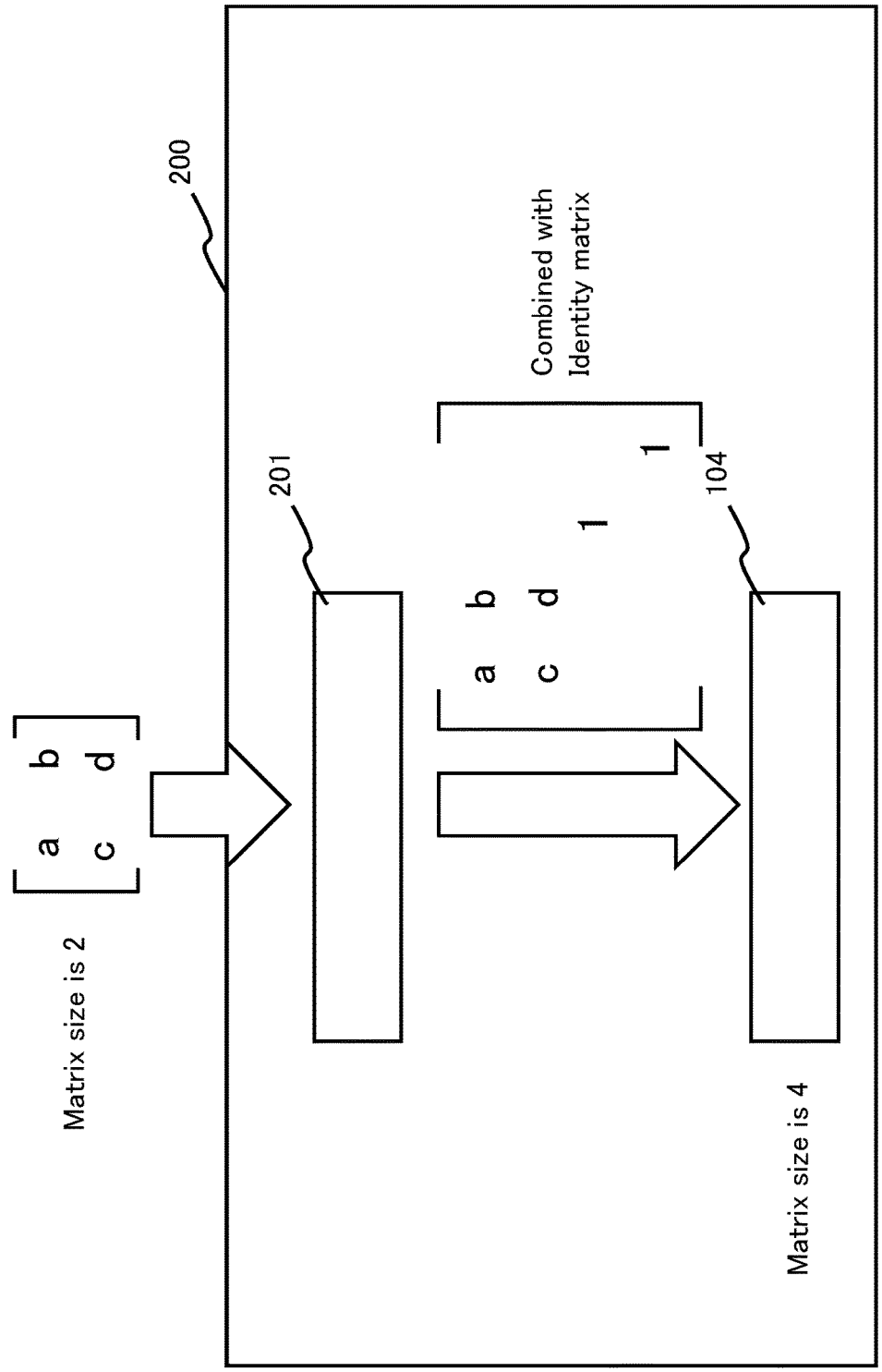
FIG. 19 is a schematic diagram illustrating the second solution described as background.

For example, the proposed recursive architecture is adapted to the precoding matrix generator 1701 which involves matrix inversion for precoder 1705 in the transmitter 1702 in the base station 1700 in the MU-MIMO communication system (see FIG. 16). Namely, one of the concrete implementation of the proposed recursive architecture will be embodied as a base station for wireless communication system.

Finally, preferable modes of the present invention will be summarized.

<Mode 1>
(See the information processing apparatus in a first aspect above)

<Mode 2>
The information processing apparatus according to mode 1, wherein the matrix size of the lower level matrix inversion processing block and of the assistant processing block, is half of the matrix size of said higher level matrix inversion processing block.

<Mode 3>
The information processing apparatus according to mode 2, wherein the assistant processing block contains three matrix multiplication blocks and one matrix subtraction block.

<Mode 4>
The information processing apparatus according to mode 2 or 3, wherein the information processing apparatus operates one of the assistant processing blocks and one of the lower level matrix inversion processing blocks to be in working state, and the other blocks to be in switching off state in the power saving mode.

<Mode 5>
The information processing apparatus according to any one of modes 1 to 4, wherein the information processing apparatus stores data according to a predetermined matrix data storing order so that the data of the left upper sub-block are firstly stored, the next is the right upper sub-block, the third is the left lower sub-block, and the last is the right lower sub-block in the power saving mode.

<Mode 6>
The information processing apparatus according to any one of modes 1 to 5, wherein
the information processing apparatus operates both of the assistant processing blocks and two of the lower level matrix inversion processing blocks to be in working state, and the other blocks to be in switching off state in the parallel processing mode.

<Mode 7>
The information processing apparatus according to any one of modes 1 to 6, wherein the information processing apparatus stores data according to a predetermined matrix data storing order so that the data of the left upper sub-block are firstly stored, the next is the right lower sub-block, the third is the left lower sub-block, and the last is the right upper sub-block in the parallel processing mode.

<Mode 8>
The information processing apparatus according to any one of modes 1 to 7, wherein the information processing apparatus dynamically reconfigures the processing block to switch between parallel processing mode and power saving mode according to the external instructions.

<Mode 9>
The information processing apparatus according to any one of modes 1 to 7, wherein
the processing block is constructed in recursive manner.
<Mode 10>
(See the base station in a second aspect above)
<Mode 11>
(See the information processing method in a third aspect above)
<Mode 12>
(See the computer program in a fourth aspect above) Modes 10 to 12 can be expanded in the same way as mode 1 is expanded to modes 2 to 9.

The disclosure of Patent Literature and Non Patent Literatures given above is hereby incorporated by reference into this specification. The exemplary embodiments may be changed and adjusted in the scope of the entire disclosure (including claims) of the present invention and based on the basic technological concept. In the scope of the claims of the present invention, various disclosed elements may be combined and selected in a variety of ways. That is, it is to be understood that modifications and changes that may be made by those skilled in the art within the scope of the present invention are included.

The invention claimed is:

1. An information processing apparatus, comprising:
   a matrix inversion calculating unit configured to includes a higher level matrix inversion processing block containing at least four lower level matrix inversion processing blocks and two assistant processing blocks, and;
   a control unit configured to reconfigures an internal structure of the matrix inversion calculating unit depending on the input matrix size.

2. The information processing apparatus according to claim 1, wherein
   the matrix size of the lower level matrix inversion processing block and of the assistant processing block, is half of the matrix size of said higher level matrix inversion processing block.

3. The information processing apparatus according to claim 2, wherein
   the assistant processing block contains three matrix multiplication blocks and one matrix subtraction block.

4. The information processing apparatus according to claim 2, wherein
   the information processing apparatus operates one of the assistant processing blocks and one of the lower level matrix inversion processing blocks to be in working state, and the other blocks to be in switching off state in the power saving mode.

5. The information processing apparatus according to claim 1, wherein
   the information processing apparatus stores data according to a predetermined matrix data storing order so that the data of the left upper sub-block are firstly stored, the next is the right upper sub-block, the third is the left lower sub-block, and the last is the right lower sub-block in the power saving mode.

6. The information processing apparatus according to claim 1, wherein
   the information processing apparatus operates both of the assistant processing blocks and two of the lower level matrix inversion processing blocks to be in working state, and the other blocks to be in switching off state in the parallel processing mode.

7. The information processing apparatus according to claim 1, wherein
   the information processing apparatus stores data according to a predetermined matrix data storing order so that the data of the left upper sub-block are firstly stored, the next is the right lower sub-block, the third is the left lower sub-block, and the last is the right upper sub-block in the parallel processing mode.

8. The information processing apparatus according to claim 1, wherein the information processing apparatus dynamically reconfigures the processing block to switch between parallel processing mode and power saving mode according to the external instructions.

9. The information processing apparatus according to claim 1, wherein
   the processing block is constructed in recursive manner.

10. The information processing apparatus according to claim 3, wherein
    the information processing apparatus operates one of the assistant processing blocks and one of the lower level matrix inversion processing blocks to be in working state, and the other blocks to be in switching off state in the power saving mode.

11. The information processing apparatus according to claim 2, wherein
    the information processing apparatus stores data according to a predetermined matrix data storing order so that the data of the left upper sub-block are firstly stored, the next is the right upper sub-block, the third is the left lower sub-block, and the last is the right lower sub-block in the power saving mode.

12. The information processing apparatus according to claim 3, wherein
    the information processing apparatus stores data according to a predetermined matrix data storing order so that the data of the left upper sub-block are firstly stored, the next is the right upper sub-block, the third is the left lower sub-block, and the last is the right lower sub-block in the power saving mode.

13. The information processing apparatus according to claim 4, wherein
    the information processing apparatus stores data according to a predetermined matrix data storing order so that the data of the left upper sub-block are firstly stored, the next is the right upper sub-block, the third is the left lower sub-block, and the last is the right lower sub-block in the power saving mode.

14. The information processing apparatus according to claim 2, wherein
    the information processing apparatus operates both of the assistant processing blocks and two of the lower level matrix inversion processing blocks to be in working state, and the other blocks to be in switching off state in the parallel processing mode.

15. The information processing apparatus according to claim 3, wherein
    the information processing apparatus operates both of the assistant processing blocks and two of the lower level matrix inversion processing blocks to be in working state, and the other blocks to be in switching off state in the parallel processing mode.

16. The information processing apparatus according to claim 4, wherein
    the information processing apparatus operates both of the assistant processing blocks and two of the lower level matrix inversion processing blocks to be in working state, and the other blocks to be in switching off state in the parallel processing mode.

17. The information processing apparatus according to claim 5, wherein
the information processing apparatus operates both of the assistant processing blocks and two of the lower level matrix inversion processing blocks to be in working state, and the other blocks to be in switching off state in the parallel processing mode.

18. A base station, comprising:
a matrix inversion calculating unit configured to includes a higher level matrix inversion processing block containing at least four lower level matrix inversion processing blocks and two assistant processing blocks, and;
a control unit configured to reconfigures an internal structure of the matrix inversion calculating unit depending on the input matrix size.

19. An information processing method for an information processing apparatus comprising a matrix inversion calculating unit that includes a higher level matrix inversion processing block containing at least four lower level matrix inversion processing blocks and two assistant processing blocks and a control unit, said information processing method comprising:
reconfiguring the internal structure of the matrix inversion calculating unit depending on the input matrix size; and
calculating the matrix inversion using said matrix inversion calculating unit.

20. A non-transitory computer-readable recording medium storing thereon a program causing a computer, which configures an information processing apparatus comprising a matrix inversion calculating unit that includes a higher level matrix inversion processing block containing at least four lower level matrix inversion processing blocks and two assistant processing blocks and a control unit, to execute:
reconfiguring the internal structure of the matrix inversion calculating unit depending on the input matrix size; and
calculating the matrix inversion using said matrix inversion calculating unit.

* * * * *